(12) United States Patent
Qian

(10) Patent No.: US 10,124,427 B2
(45) Date of Patent: Nov. 13, 2018

(54) TWIN SAW BLADE CUTTER

(71) Applicant: NINGBO BLACKPINE TOOLS CO., LTD, Ningbo (CN)

(72) Inventor: Zhongguang Qian, Ningbo (CN)

(73) Assignee: NINGBO BLACKPINE TOOLS CO., LTD., Ningbo (CN)

( * ) Notice: Subject to any disclaimer, the term of this patent is extended or adjusted under 35 U.S.C. 154(b) by 390 days.

(21) Appl. No.: 15/130,171

(22) Filed: Apr. 15, 2016

(65) Prior Publication Data

US 2016/0228959 A1 Aug. 11, 2016

Related U.S. Application Data

(62) Division of application No. 13/502,596, filed as application No. PCT/CN2011/001171 on Jul. 18, 2011.

(30) Foreign Application Priority Data

Nov. 30, 2010 (CN) ...................... 2010 2 0649582 U

(51) Int. Cl.
*B26D 1/14* (2006.01)
*B23D 45/10* (2006.01)
(Continued)

(52) U.S. Cl.
CPC ........... *B23D 45/10* (2013.01); *B23D 47/126* (2013.01); *B27B 5/30* (2013.01); *B27B 5/32* (2013.01)

(58) Field of Classification Search
CPC .... B23D 49/006; B23D 45/10; B23D 45/165; B23D 47/12; B23D 53/005; B23D 55/082; B23D 47/126; B27B 5/32; B27B 5/34
(Continued)

(56) References Cited

U.S. PATENT DOCUMENTS 2,751,942 A 6/1956 Emmons et al.
2,818,094 A 12/1957 Bowling
(Continued)

FOREIGN PATENT DOCUMENTS

CN 1623711 6/2005
CN 2728685 9/2005
(Continued)

*Primary Examiner* — Andrew M Tecco
*Assistant Examiner* — Eyamindae Jallow
(74) *Attorney, Agent, or Firm* — Hamre, Schumann, Mueller & Larson, P.C.

(57) ABSTRACT

The present utility model relates to a twin saw blade cutter, improves upon the existing foundation of inner and outer saw blades, small and large output shafts, first and second gearwheels and a power gear shaft, etc., in that the small output shaft is designed with a first annular locking groove and a second annular locking groove located between the first and second gearwheels, a first locking spring which presses against a fifth bearing is mounted in the first annular locking groove, a second locking spring is mounted in the second annular locking groove, and at the same time a flexible piece which arches towards the side of the second locking spring is further sleeved on the small output shaft, the two ends of the flexible piece pressing against the second gearwheel and the second locking spring respectively. After adopting the above solution, it is possible to not only prevent outward protrusion of the small output shaft, but also prevent retraction of the small output shaft, and at the same time absorb the cumulative manufacturing tolerance of the various components and preload the small output shaft in the axial direction, thereby ensuring coincidence of the axial positions of the two shafts such that the inner saw blade has a limited amount of space for sliding movement left and right, and ensuring that there is an appropriate gap between the two saw blades at all times, such that the cutting operation may proceed smoothly and reliably.

14 Claims, 6 Drawing Sheets

(51) Int. Cl.
    *B27B 5/30* (2006.01)
    *B23D 47/12* (2006.01)
    *B27B 5/32* (2006.01)

(58) Field of Classification Search
    USPC ...... 30/369; 83/439, 792; 173/213, 214, 217
    See application file for complete search history.

(56) References Cited

U.S. PATENT DOCUMENTS

| | | | |
|---|---|---|---|
| 3,595,110 A | 6/1971 | Topliss | |
| 4,589,458 A | 5/1986 | McCord, Jr. | |
| 4,784,029 A | 11/1988 | Gebelius | |
| 5,020,280 A | 6/1991 | O'Reilly | |
| 5,027,517 A | 7/1991 | Reuter | |
| 5,174,099 A * | 12/1992 | Matsuura | A01D 34/76 30/276 |
| 5,279,344 A | 1/1994 | Rautio | |
| 5,309,962 A | 5/1994 | McCord, Jr. | |
| 5,449,043 A | 9/1995 | Bourner et al. | |
| 5,537,728 A | 7/1996 | Van Mourik | |
| 5,636,428 A | 6/1997 | Van Mourik | |
| 5,996,462 A | 12/1999 | Gittel et al. | |
| 6,564,459 B1 | 5/2003 | Steinbrueck et al. | |
| 6,874,400 B2 | 4/2005 | Johansson | |
| 7,143,759 B1 | 12/2006 | Wang | |
| 8,250,958 B2 | 8/2012 | Chen | |
| 2002/0170408 A1* | 11/2002 | Hartmann | B24B 23/022 83/666 |
| 2003/0000363 A1 | 1/2003 | Hofmann et al. | |
| 2003/0150298 A1 | 8/2003 | Kusama | |
| 2003/0188440 A1 | 10/2003 | Dean | |
| 2004/0182217 A1 | 9/2004 | Ericsson | |
| 2005/0224245 A1 | 10/2005 | Kamimura et al. | |
| 2006/0185492 A1 | 8/2006 | Chianese | |
| 2006/0266176 A1 | 11/2006 | Brach | |
| 2008/0017007 A1 | 1/2008 | Weber et al. | |
| 2010/0180454 A1* | 7/2010 | Cheng | B23D 45/10 30/388 |
| 2011/0127059 A1* | 6/2011 | Limberg | F16D 7/044 173/216 |
| 2011/0162494 A1 | 7/2011 | Huang | |
| 2012/0132048 A1 | 5/2012 | Chen | |
| 2013/0048330 A1* | 2/2013 | Ikuta | B25B 23/141 173/216 |

FOREIGN PATENT DOCUMENTS

| | | |
|---|---|---|
| CN | 201186366 | 1/2009 |
| CN | 101767224 | 7/2010 |
| DE | 29813230 | 12/1999 |
| WO | 99/4478 | 9/1999 |

* cited by examiner

TWIN SAW BLADE CUTTER

TECHNICAL FIELD

The present utility model relates to a cutting tool, and in particular refers to a cutter with twin saw blades.

BACKGROUND ART

A type of cutter in common use is a single saw blade cutter with an abrasive wheel cutting blade or a metal cutting blade; during cutting, this will exert a pushing force on the workpiece in the direction of rotation of the cutter, and a corresponding clamping force must be applied to the workpiece in order to ensure that the cutting work progresses smoothly. Although such a common single saw blade cutter is also able to achieve the cutting objective, such a cutter has low operational efficiency, the cutter blades thereof wear quickly, and it is moreover dangerous to operate. For these reasons, people have designed a cutter with twin saw blades; for instance, the "dual saw blade cutter" with Chinese patent grant announcement no. CN2728685Y has disclosed just such a tool, which comprises a machine body and a machine head, the machine head further comprising a guard, a head shell, an inner saw blade, an outer saw blade and a drive mechanism, wherein the drive mechanism is further composed of an output shaft, a sleeve shaft, a first gearwheel, a second gearwheel and a power gear shaft; the sleeve shaft is sleeved onto the output shaft and fixed on an end cover by means of a pair of sleeve shaft bearings, the first gearwheel is fixed on the sleeve shaft, the second gearwheel is fixed on the output shaft, the teeth of the power gear shaft are engaged with the first and second gearwheels respectively, the inner saw blade and an inner pressure plate are sleeved successively on an outer end section of the output shaft, with the inner saw blade being pressed on an outer end face of the sleeve shaft by the inner pressure plate; the inner pressure plate and the output shaft are connected together by a socket connection therebetween, and the outer saw blade is fixed on the output shaft by an outer pressure plate and the inner pressure plate. In the twin saw blade cutter employing the above structure, the fact that the direction of rotation of the inner saw blade is opposite to that of the outer saw blade during cutting operation means that cutting resistance during the cutting process is small and the forces on the workpiece are small, and therefore the workpiece clamping force is small, operational safety is good, and cutting noise is low, and it is also distinguished by high cutting efficiency and a flat cutting surface.

However, during actual operation, the above twin saw blade cutter will manifest the following deficiencies: (1) As a result of cumulative error in machining of the assembly components, the output shaft will have a certain degree of axial play, which will cause the outer saw blade to have axial play, with the end result that the smoothness of rotation of the inner and outer saw blades will be affected. (2) The power gear shaft forms a drive pair which is a spiral bevel gear set with the first gearwheel and the second gearwheel respectively, and these rotate in forward and reverse directions around the same center of rotation; this structure results in the power gear shaft always having the tendency to be displaced axially towards the side of the first gearwheel and the second gearwheel when it is rotating, and thus after a long period of operation, wear between the power gear shaft and the first and second gearwheels will be accelerated; in serious cases, proper meshing will become impossible and the phenomenon of free spinning will occur. (3) The method of mounting the inner and outer saw blades cannot ensure the coaxiality and perpendicularity of the saw blades relative to the center of rotation. (4) Since the outer saw blade is fixed on the output shaft by the outer pressure plate and the inner pressure plate, and the inner pressure plate and the output shaft are made as a split-type structure, which split-type structure will affect the mounting position of the outer saw blade on the output shaft, the smoothness of cutting of the two saw blades will be affected as a result.

Content of the Utility Model

The technical problem which the present utility model seeks to solve is to provide a twin saw blade cutter capable of effectively avoiding axial play in the small output shaft in response to the current technical situation described above, and thereby enable the relative positions of the inner and outer saw blades to be ensured, such that cutting work can proceed smoothly.

The technical solution employed in the present utility model in solving the above technical problem is: the twin saw blade cutter comprises a machine body and a machine head, the machine head further including a gearwheel box, an inner saw blade, an outer saw blade and a drive mechanism, wherein the drive mechanism is further composed of a small output shaft, a large output shaft sleeved on the small output shaft, a first gearwheel, a second gearwheel and a power gear shaft, with said large output shaft being mounted in a box cover of the gearwheel box by means of a first and a second bearing, and said small output shaft being supported in an inner hole of said large output shaft and in a box body of the gearwheel box by means of a third bearing and a fourth bearing; said first gearwheel is sleeved loosely on said small output shaft by means of a fifth bearing, and fixed on said large output shaft; the second gearwheel is fixed on said small output shaft, and is arranged opposite to said first gearwheel; said power gear shaft extends into said machine head through a through-hole on the box body of the gearwheel box, with teeth on the power gear shaft engaging said first and second gearwheels respectively; and said inner and outer saw blades are fixed on said large and small output shafts respectively, wherein said small output shaft is designed with a first annular locking groove and a second annular locking groove located between said first gearwheel and second gearwheel, a first locking spring which presses against said fifth bearing being mounted in said first annular locking groove, and a second locking spring being mounted in said second annular locking groove, and at the same time a flexible piece which arches towards the side of said second locking spring is further sleeved on said small output shaft, one end of the flexible piece pressing against an end face of the second gearwheel and the other end pressing against said second locking spring.

In the above solution, an end face of said second gearwheel can have a recess thereon, with said flexible piece sitting in the recess, which serves to locate the flexible piece.

As a further improvement of the present utility model, said through-hole can be a stepped hole which narrows towards the side of said first and second gearwheels, a sixth bearing which supports said power gear shaft is located in a large hole of the stepped hole, and at the same time said power gear shaft has a step thereon which presses against an outer end face of said sixth bearing. In this way, the step on the stepped hole and the step on the power gear shaft can be used to effectively prevent the power gear shaft from moving towards the side of the first and second gearwheels, in order to ensure normal meshing between the gearwheels, reduced wear and smooth running.

In each of the above solutions, the following structure can be used as a fixing method between the inner saw blade and the large output shaft: a plurality of pin holes are distributed concentrically on an outer end face of said large output shaft, while the inner saw blade is provided thereon with through-holes corresponding to the plurality of pin holes, and pins are inserted into said pin holes after passing through the through-holes to achieve fixing of said inner saw blade to the large output shaft. This structure transmits the cutting force through three pin shafts, can ensure the coaxiality, perpendicularity and pulsation of the inner saw blade relative to the center of rotation, is convenient to manufacture and facilitates mass production. Of course, the following fixing method may also be employed: the outer end face of said large output shaft has a polygonal boss thereon, while said inner saw blade is provided thereon with a mounting hole which fits the boss closely, and said boss is inserted tightly into said mounting hole to achieve fixing of said inner saw blade to the large output shaft. This solution enables strict control of the concentricity, axial positioning and perpendicularity of the inner saw blade relative to the large output shaft, with the result that the inner saw blade cuts smoothly and the transmitted torque is large, and it also facilitates mass production.

By the same reasoning, the following structure can be used as a fixing method between the outer saw blade and the small output shaft: an outer end section of said small output shaft is produced with an integral platform for said outer saw blade to bear against, a plurality of pin holes being distributed concentrically on the platform, while the outer saw blade is provided thereon with through-holes corresponding to the plurality of pin holes, and pins after passing through the through-holes are inserted into the corresponding pin holes to achieve fixing of said outer saw blade to the small output shaft. Employing an integrally produced platform to replace the original inner pressure plate not only makes assembly convenient, but also reduces error, and thus the mounting position of the outer saw blade can be further ensured; moreover, such a solution in which the cutting force is transmitted through three pin shafts can likewise ensure the coaxiality, perpendicularity and pulsation of the outer saw blade relative to the center of rotation, and facilitates mass production. Of course, another structure may also be used as a fixing method between the outer saw blade and the small output shaft: an end section of said small output shaft is produced with an integral platform for said outer saw blade to bear against, with the platform having a polygonal boss thereon, the height of the boss being less than the thickness of the outer saw blade, and a screw hole being axially provided in the boss; a mounting hole matching the boss is provided on said outer saw blade, said outer saw blade is fitted over said boss by means of the mounting hole, a pressure plate is held against the outer side of said outer saw blade, and a screw is thread-connected in said screw hole after passing through said pressure plate to achieve fixing of said outer saw blade to the small output shaft. This solution can ensure that the outer saw blade is pressed tightly onto the boss and fastened to the small output shaft to form a single unit, such that minimum runout of the outer saw blade is maintained during rotation, with the result that the outer saw blade cuts smoothly and the transmitted torque is large, and it also facilitates mass production.

In the above solution, as a further improvement, said first bearing and third bearing are located in the same sectional plane, this cross-section being perpendicular to said small output shaft; such a solution helps to improve rigidity of support.

Compared to existing technology, the fact that two annular locking grooves and two locking springs are added in the present utility model means that the pressing of the first locking spring against the end surface of the fifth bearing can be utilized to prevent outward protrusion of the small output shaft, while retraction of the small output shaft can be prevented with the aid of the second locking spring; at the same time, the added flexible piece can not only absorb the cumulative tolerance arising in the manufacture of various components such as the gearwheel box, ensuring coincidence of the axial positions of the large and small output shafts after installation, but can also cause the small output shaft to have a tendency towards outward protrusion at all times, such that the small output shaft is preloaded in the axial direction, ensuring that the inner saw blade has a limited amount of space for sliding movement left and right; as a result, it can be ensured that there is an appropriate gap between the two saw blades at all times, such that the cutting operation may proceed smoothly and reliably.

DESCRIPTION OF THE ACCOMPANYING DRAWINGS

PARTICULAR EMBODIMENTS

Figure 1:
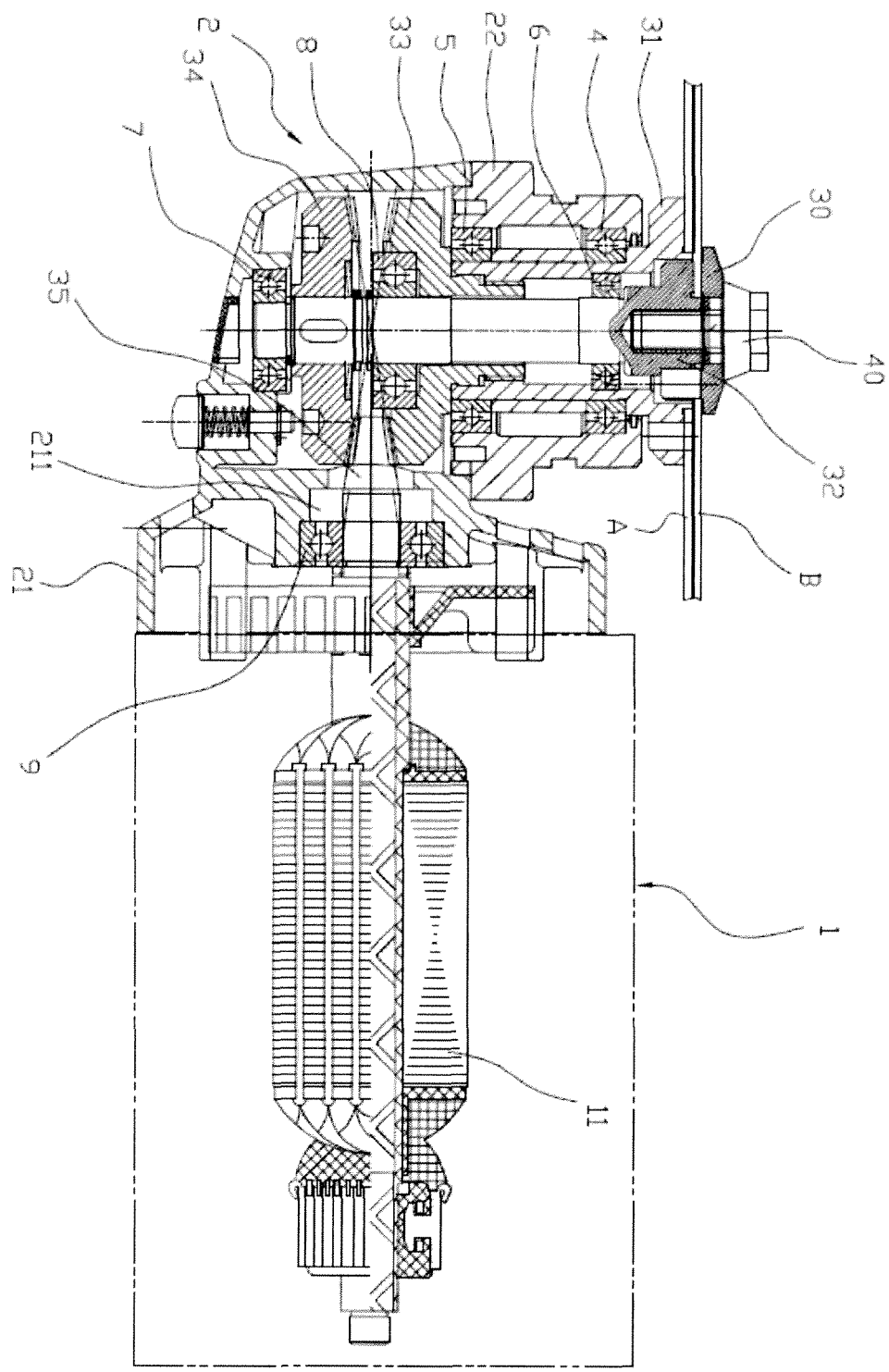
FIG. 1 is a schematic diagram of the structure of an embodiment of the present utility model.

The present utility model will be described in further detail below in conjunction with the embodiments of the accompanying drawings.

As shown in FIG. 1 to FIG. 6, the twin saw blade cutter comprises a machine body 1 and a machine head 2, the machine head 2 further including a box body 21 and box cover 22 of a gearwheel box, an inner saw blade A, an outer saw blade B and a drive mechanism 3, the drive mechanism being further composed of a large output shaft 31, a small output shaft 32, a first gearwheel 33, a second gearwheel 34 and a power gear shaft 35, wherein the box body 21 of the gearwheel box is fixed to the machine body 1; the large output shaft 31 is sleeved on the small output shaft 32, the large output shaft 31 being mounted in the box cover 22 of the gearwheel box by means of a first bearing 4 and a second bearing 5; the small output shaft 32 is supported in an inner hole of said large output shaft and in the box body of the gearwheel box by means of a third bearing 6 and a fourth bearing 7, the first gearwheel 33 is sleeved loosely on the small output shaft 32 by means of a fifth bearing 8 and screw-fixed on the large output shaft 31, and in this way said first bearing 4 and second bearing 5 are locked in the box cover 22 of the gearwheel box by the first gearwheel 33. The second gearwheel 34 is fixed on the small output shaft 32 by means of a conventional keyway structure, and arranged opposite to said first gearwheel 33. The inner and outer saw blades are respectively located outside the gearwheel box, and fixed on the large and small output shafts respectively.

A motor 11 is mounted in the machine body 1, an output shaft of the motor being the power gear shaft 35, which extends into the machine head 2, supported by a sixth bearing 9, through a through-hole on the box body of the gearwheel box, with teeth on an end section of the power gear shaft engaging with the first and second gearwheels respectively. During use, as the motor 11 is started, the power gear shaft 35 rotates, and can set the first gearwheel 33 and the second gearwheel 34 in rotation, in such a way that the first gearwheel and the second gearwheel have opposite directions of rotation, so that the large and small output shafts have opposite directions of rotation, with the final result that the inner and outer saw blades rotate in opposite directions, achieving the objective of having the cutting forces cancel each other out.

Figure 5:
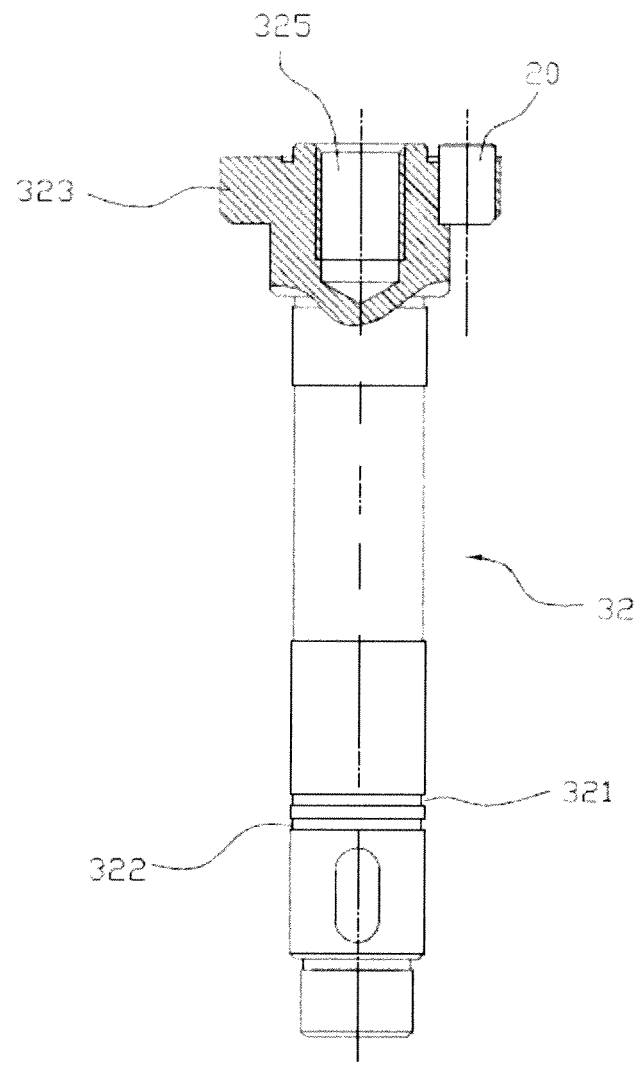
FIG. 5 is a semi-sectional schematic diagram of the small output shaft in FIG. 1.
Figure 6:
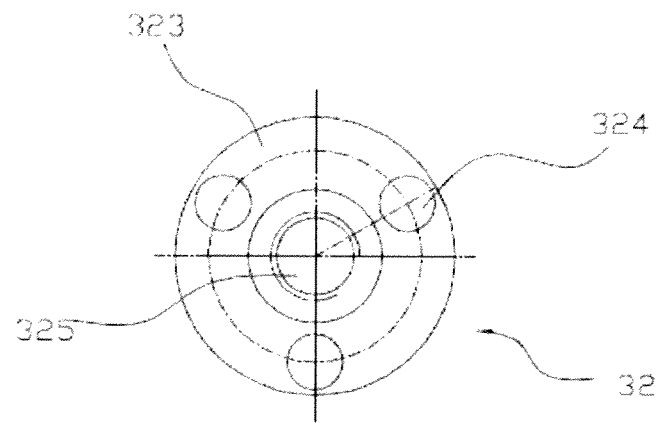
FIG. 6 is a view from above of FIG. 5.

In consideration of such factors as the unevenness of the two saw blades themselves and the cumulative error in machining of the assembly components, and in order to ensure reliable and smooth running of the inner and outer saw blades, in the present utility model the small output shaft 32 is designed to also have a first annular locking groove 321 and a second annular locking groove 322, please refer to FIG. 5; the first annular locking groove and the second annular locking groove are located between the first gearwheel 33 and the second gearwheel 34, a first locking spring C which presses against said fifth bearing 8 is mounted in the first annular locking groove, a second locking spring D is mounted in the second annular locking groove, and at the same time an end face of the second gearwheel also has a recess 341 thereon, with the recess 341 being provided therein with a flexible piece 10 which arches towards the side of the second locking spring D and presses against the second locking spring; in the present embodiment, a butterfly flexible piece is used as the flexible piece.

Moreover, in order to enable reduction of wear while having the power gear shaft 35 engage effectively with the first gearwheel 33 and the second gearwheel 34, said through-hole is designed as a stepped hole 211 which narrows towards the side of the first and second gearwheels, said sixth bearing 9 being located in a large hole of the stepped hole, and at the same time the power gear shaft has a step 351 thereon which presses against an outer end face of the sixth bearing 9. During operation, the step on the stepped hole and the step on the power gear shaft can be used to prevent the power gear shaft from moving towards the side of the first and second gearwheels; thus the axial component of force generated will not change the center-to-center spacing at installation, in order to ensure normal meshing between the gearwheels and smooth running.

Figure 2:
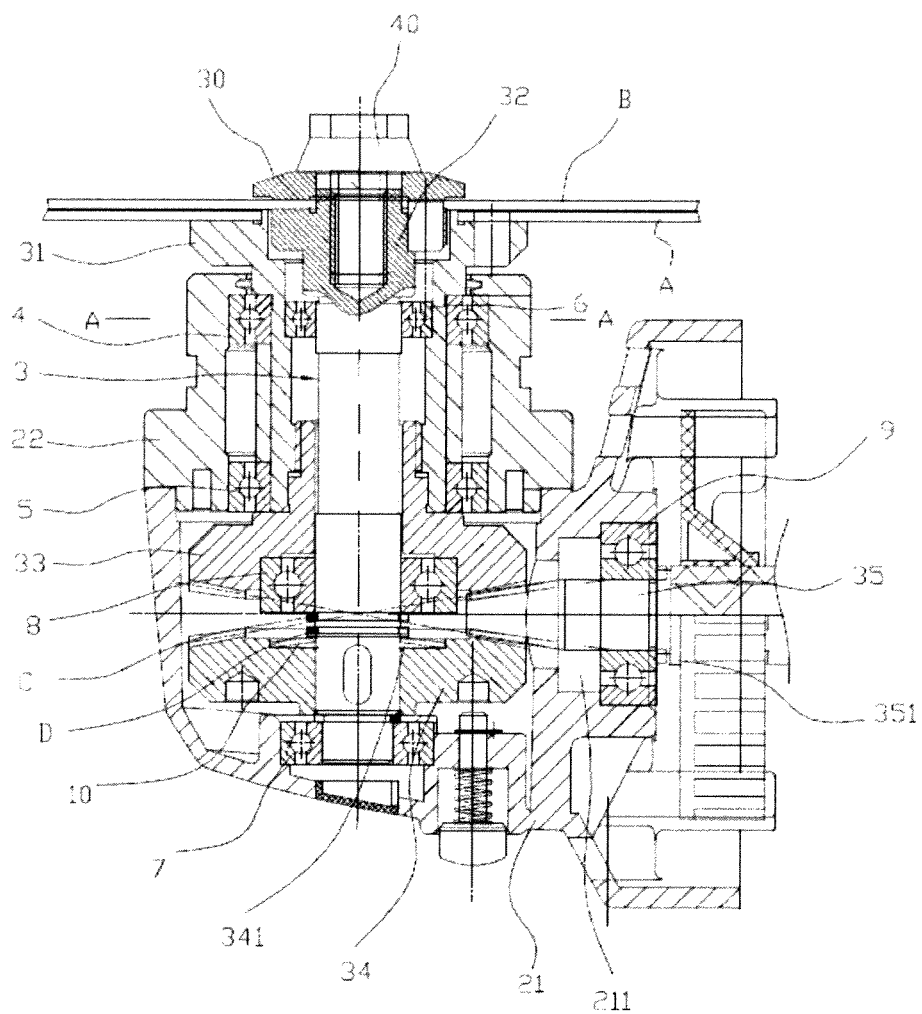
FIG. 2 is an enlarged schematic diagram of the machine head part in FIG. 1.

In the present embodiment, said first bearing 4 and third bearing 6 are located in the same cross-section, which is the cross-section along line A-A shown in FIG. 2; this cross-section is perpendicular to the small output shaft, and such a structure has good rigidity of support, making the rotation of the large and small output shafts more stable and reliable.

Figure 3:
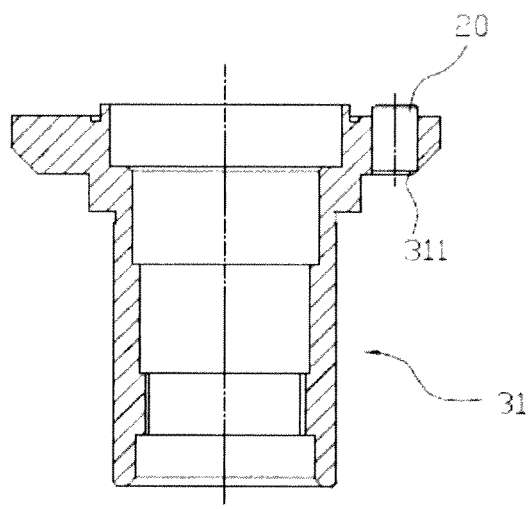
FIG. 3 is a semi-sectional schematic diagram of the large output shaft in FIG. 1.
Figure 4:
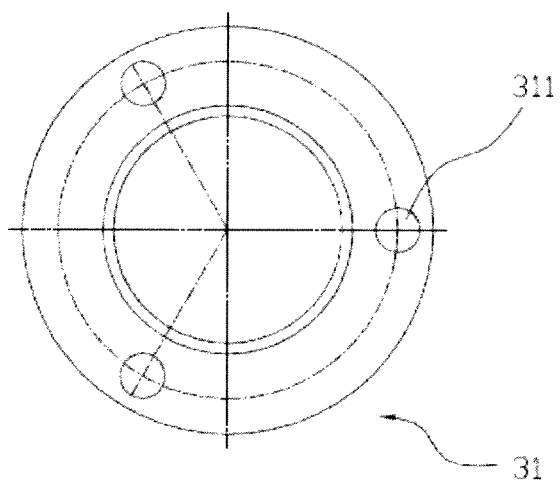
FIG. 4 is a view from above of FIG. 3.

In the present embodiment, the methods of fixing the inner and outer saw blades to the large and small output shafts respectively are as follows: a plurality of pin holes 311 are distributed concentrically on an outer end face of said large output shaft 31; here, there are three pin holes which are uniformly distributed on the outer end face of the large output shaft, please refer to FIG. 3 and FIG. 4; while the inner saw blade is provided thereon with through-holes corresponding to the plurality of pin holes (not shown in the figures), and pins 20 are inserted into said pin holes 311 after passing through the through-holes to achieve fixing of the inner saw blade A to the large output shaft. By the same reasoning, an outer end section of the small output shaft 32 is produced with an integral platform 323 for the outer saw blade B to bear against, and three pin holes 324 are distributed concentrically on the platform, please refer to FIG. 5 and FIG. 6; while the outer saw blade is provided thereon with through-holes corresponding to the three pin holes (not shown in the figures), and pins 20 after passing through the through-holes are inserted into the corresponding pin holes 324 to achieve fixing of the outer saw blade to the small output shaft; at the same time, a pressure plate 30 can be provided on the outer side of the outer saw blade, and a screw 40 is thread-connected in a screw hole 325 of the small output shaft after passing through the pressure plate, to further lock the outer saw blade B. In such a structure, the cutting force is transmitted by three pin shafts, so the coaxiality, perpendicularity and pulsation of the saw blades relative to the center of rotation can be ensured, and the technology is simple, with good manufacturability, facilitating mass production.

Figure 7:
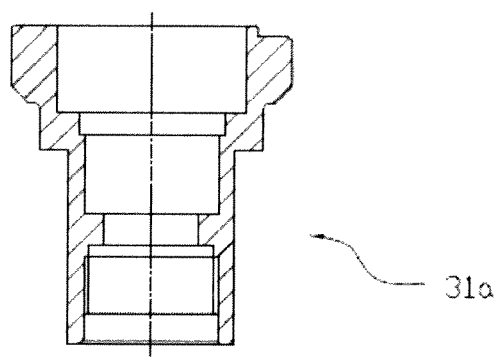
FIG. 7 is a semi-sectional schematic diagram of another structure of the large output shaft in FIG. 1.
Figure 8:
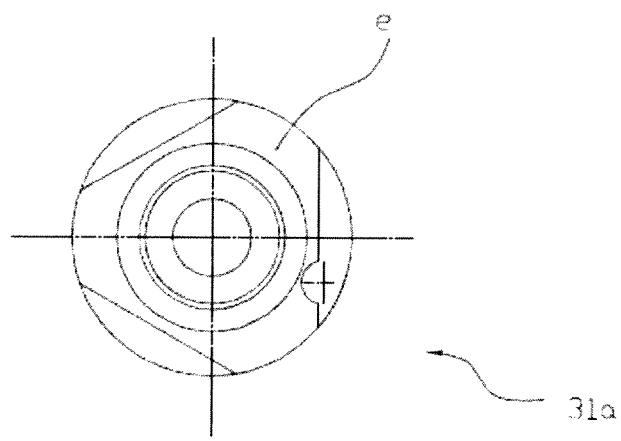
FIG. 8 is a view from above of FIG. 7.
Figure 9:
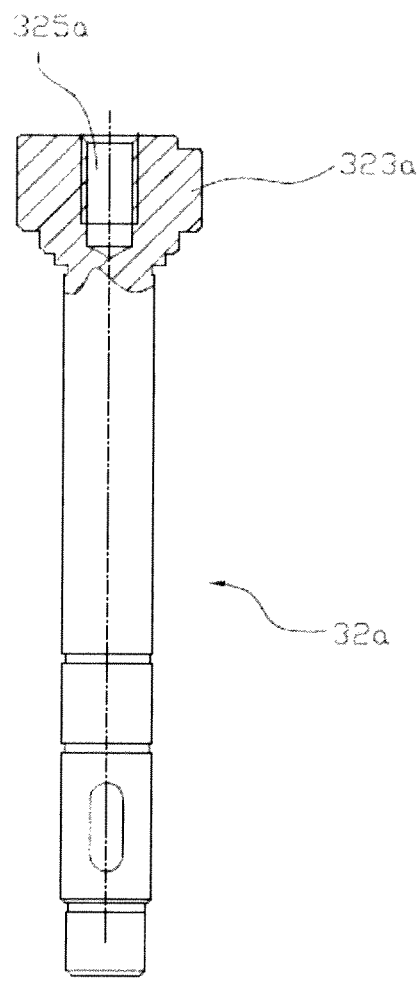
FIG. 9 is a semi-sectional schematic diagram of another structure of the small output shaft in FIG. 1.
Figure 10:
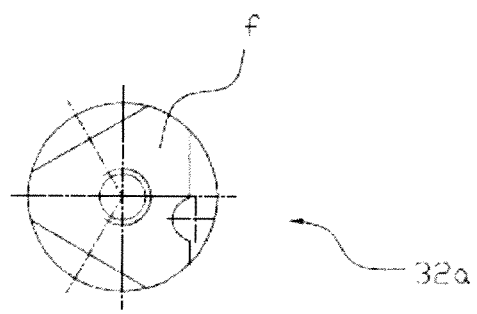
FIG. 10 is a view from above of FIG. 9.

Apart from the above embodiment, other modes of implementation are possible for the method of fixing the inner and outer saw blades of the present utility model; for instance, the outer end face of the large output shaft 31a has an approximately triangular boss e thereon, while the inner saw blade is provided thereon with a mounting hole which fits the boss closely, and the boss is inserted tightly into the mounting hole to achieve fixing of the inner saw blade A to the large output shaft, please refer to FIG. 7 and FIG. 8. By the same reasoning, the outer end section of the small output shaft 32 is produced with an integral platform 323a for said outer saw blade to bear against, with the platform having an approximately triangular boss f thereon, the height of the boss being less than the thickness of the outer saw blade B, and a screw hole 325a being axially provided in the boss, please refer to FIG. 9 and FIG. 10; a mounting hole matching the boss is provided on the outer saw blade, the outer saw blade is fitted over the boss by means of the mounting hole, the pressure plate 30 is likewise held against the outer side of the outer saw blade B, and the screw 40 is thread-connected in said screw hole 325a after passing through the pressure plate to achieve fixing of the outer saw blade B to the small output shaft 32. Such a structure enables strict control of the concentricity, axial positioning and perpendicularity of the saw blades relative to their respective output shafts, with the result that the saw blades cut smoothly and the transmitted torque is large, and it also facilitates mass production. Of course, the shape of the boss need not rigidly adhere to the triangular structure described above. All technical solutions formed using equivalent variations or substitutions with identical effects should all fall within the scope of protection of the claims of the present utility model.

The invention claimed is:

1. A twin saw blade cutter comprising a machine body and a machine head, said machine head further including a gearwheel box, an inner saw blade, an outer saw blade and a drive mechanism, wherein said drive mechanism is further composed of a small output shaft, a large output shaft sleeved on said small output shaft, a first gearwheel, a second gearwheel and a power gear shaft, with said large output shaft being mounted in a box cover of said gearwheel box by means of a first and a second bearing, and said small output shaft being supported in an inner hole of said large output shaft and in a box body of said gearwheel box by means of a third and a fourth bearing; said first gearwheel is sleeved loosely on said small output shaft by means of a fifth bearing, and fixed on said large output shaft; said second gearwheel is fixed on said small output shaft, and is arranged opposite to said first gearwheel; said power gear shaft extends into said machine head through a through-hole on said box body of said gearwheel box, with teeth on said power gear shaft engaging said first and second gearwheels respectively; and said inner and outer saw blades are fixed on said large and small output shafts respectively, wherein said small output shaft is designed with a first annular locking groove and a second annular locking groove located between said first gearwheel and second gearwheel, a first locking spring which presses against said fifth bearing being mounted in said first annular locking groove, and a second locking spring being mounted in said second annular locking groove, and at a same time a flexible piece which arches towards a side of said second locking spring is further sleeved on said small output shaft, one end of said flexible piece pressing against an end face of said second gearwheel and other end pressing against said second locking spring.

2. The twin saw blade cutter as claimed in claim 1, wherein an end face of said second gearwheel has a recess thereon, with said flexible piece sitting in the recess.

3. The twin saw blade cutter as claimed in claim 1, wherein said through-hole is a stepped hole which narrows towards a side of said first and second gearwheels, a sixth bearing which supports said power gear shaft is located in a large hole of said stepped hole, and at a same time said power gear shaft has a step thereon which presses against an outer end face of said sixth bearing.

4. The twin saw blade cutter as claimed in claim 1, wherein a plurality of pin holes are distributed concentrically on an outer end face of said large output shaft, while said inner saw blade is provided thereon with through-holes corresponding to said plurality of pin holes, and pins are inserted into said pin holes after passing through said through-holes to achieve fixing of said inner saw blade to said large output shaft.

5. The twin saw blade cutter as claimed in claim 1, wherein an outer end section of said small output shaft is produced with an integral platform for said outer saw blade to bear against, a plurality of pin holes being distributed concentrically on said platform, while said outer saw blade is provided thereon with through-holes corresponding to said plurality of pin holes, and pins after passing through said through-holes are inserted into said corresponding pin holes to achieve fixing of said outer saw blade to the small output shaft.

6. The twin saw blade cutter as claimed in claim 1, wherein an outer end face of said large output shaft has a polygonal boss thereon, while said inner saw blade is provided thereon with a mounting hole which fits the boss closely, and said boss is inserted tightly into said mounting hole to achieve fixing of said inner saw blade to said large output shaft.

7. The twin saw blade cutter as claimed in claim 1, wherein an end section of said small output shaft is produced with an integral platform for said outer saw blade to bear against, with said platform having a polygonal boss thereon, a height of said boss being less than a thickness of said outer saw blade, and a screw hole being axially provided in said boss; a mounting hole matching said boss is provided on said outer saw blade, said outer saw blade, said outer saw blade is fitted over said boss by means of said mounting hole, a pressure plate is held against an outer side of the said outer saw blade, and a screw is thread-connected in said screw hole after passing through said pressure plate to achieve fixing of said outer saw blade to said small output shaft.

8. The twin saw blade cutter as claimed in claim 1, wherein said first bearing and third bearing are located in a same sectional plane, this cross-section being perpendicular to said small output shaft.

9. The twin saw blade cutter as claimed in claim 2, wherein said through-hole is a stepped hole which narrows towards a side of said first and second gearwheels, a sixth bearing which supports said power gear shaft is located in a large hole of said stepped hole, and at a same time said power gear shaft has a step thereon which presses against an outer end face of said sixth bearing.

10. The twin saw blade cutter as claimed in claim 9, wherein a plurality of pin holes are distributed concentrically on an outer end face of said large output shaft, while said inner saw blade is provided thereon with through-holes corresponding to said plurality of pin holes, and pins are inserted into said pin holes after passing through said though-holes to achieve fixing of said inner saw blade to said large output shaft.

11. The twin saw blade cutter as claimed in claim 10, wherein an outer end section of said small output shaft is produced with an integral platform for said outer saw blade to bear against, a plurality of pin holes being distributed concentrically on said platform, while said outer saw blade is provided thereon with through-holes corresponding to said plurality of pin holes, and pins after passing through said through-holes are inserted into said corresponding pin holes to achieve fixing of said outer saw blade to the small output shaft.

12. The twin saw blade cutter as claimed in claim 11, wherein an outer end face of said large output shaft has a polygonal boss thereon, while said inner saw blade is provided thereon with a mounting hole which fits the boss closely, and said boss is inserted tightly into said mounting hole to achieve fixing of said inner saw blade to said large output shaft.

13. The twin saw blade cutter as claimed in claim 12, wherein an end section of said small output shaft is produced with an integral platform for said outer saw blade to bear against, with said platform having a polygonal boss thereon, a height of said boss being less than a thickness of said outer saw blade, and a screw hole being axially provided in said boss; a mounting hole matching said boss is provided on said outer saw blade, said outer saw blade is fitted over said boss by means of said mounting hole, a pressure plate is held against an outer side of said outer saw blade, and a screw is thread-connected in said screw hole after passing through said pressure plate to achieve fixing of said outer saw blade to said small output shaft.

14. The twin saw blade cutter as claimed in claim 13, wherein said first bearing and third bearing are located in a same sectional plane, this cross-section being perpendicular to said small output shaft.

* * * * *